Figure 1:
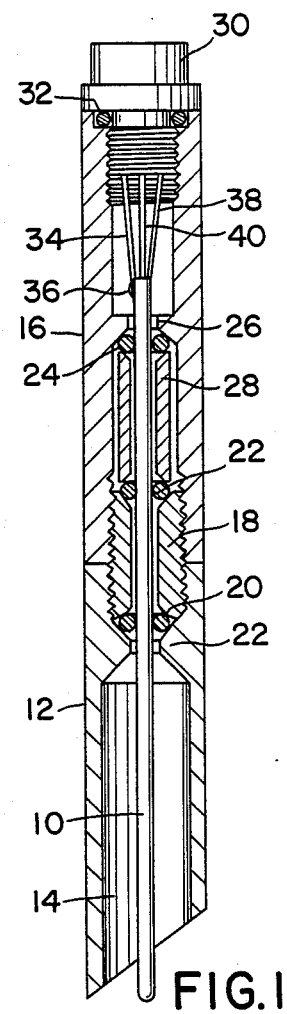

United States Patent [19]

Ishikawa

[11] Patent Number: 4,902,962
[45] Date of Patent: Feb. 20, 1990

[54] DETECTION OF THE SURFACE OF A LIQUID OR FOAM INCLUDING MOISTURE INHIBITING

[75] Inventor: Yoichi Ishikawa, Tokyo, Japan

[73] Assignee: Able Corporation, Tokyo, Japan

[21] Appl. No.: 269,134

[22] Filed: Nov. 9, 1988

[51] Int. Cl.$^4$ .................. G01R 27/26; G01N 27/02
[52] U.S. Cl. .................. 324/690; 324/441; 73/304 R
[58] Field of Search .................. 324/61 P, 61 R, 65 R, 324/65 P, 441; 73/304 C, 304 R

[56] References Cited

U.S. PATENT DOCUMENTS

| | | | |
|---|---|---|---|
| 4,059,016 | 11/1977 | Kitzinger et al. | 73/304 R |
| 4,204,203 | 5/1980 | Verne | 73/304 R X |
| 4,361,038 | 11/1982 | Schuler | 73/304 C X |
| 4,383,544 | 5/1983 | Vosper | 73/304 R X |
| 4,418,571 | 12/1983 | Asmundsson et al. | 73/304 C |
| 4,574,328 | 3/1986 | Maier | 73/304 C X |

Primary Examiner—Gerard R. Strecker
Assistant Examiner—Jack B. Harvey
Attorney, Agent, or Firm—Barnes, Kisselle, Raisch, Choate, Whittemore & Hulbert

[57] ABSTRACT

In an apparatus for detecting the surface of a liquid or foam, for example in a fermentation vessel a detector electrode (10) is surrounded at its lower end by a protective shroud (12) so as to protect a confined vapor space (14) surrounding the detector electrode. The vapor in the space (14) is maintained at a relatively low humidity either by heating the detector electrode or some other part of the apparatus or by purging the space (14) with a relatively dry air or gas. It is thereby ensured that no condensation onto the O-ring seal (20) and surrounding parts takes place. The shroud (12) also protects the parts from splashing.

8 Claims, 1 Drawing Sheet

DETECTION OF THE SURFACE OF A LIQUID OR FOAM INCLUDING MOISTURE INHIBITING

DESCRIPTION

The present invention relates to an apparatus for and method of detecting the surface of a liquid or of a foam. The present invention is particularly useful in connection with fermentation processes.

In carrying out fermentation processes in a vessel or vat, it is customary to detect the surface of the liquid or foam by detecting a change in the electrical conductivity or capacitance between a detector electrode and a counter-electrode. The detector electrode is arranged at the top of the fermentation vessel and projects downwardly for the purpose of detecting when the liquid or foam rises to the tip of the electrode. The counter electrode is surrounded in the liquid or foam to establish and maintain good electrical contact therewith.

The detector electrode must be insulated. However it remains in contact with the vapour within the vessel above the surface to be detected. When the temperature of the liquid is higher than that of the vapour, the humidity of the vapour is increased to the extent that moisture condenses on the insulating parts by which the detector electrode is insulated in relation to other parts, including the counter-electrode. Condensation on to the detector electrode itself also takes place. This phenomenon increases the electrical conductivity and capacitance. As a result, erroneous detection signals can be generated.

In the event of vigorous agitation or forming of the content of the fermentation vessel ocurring during aerobic fermentation or aeration, the liquid is splashed and becomes deposited on the detector electrode and on the insulating parts so that erroneous detection signals may be produced as described above. It is known to introduce anti-foaming agents during fermentation in order to break up foam once foam has been detected. In many cases, an excessive amount of anti-foaming agent is introduced, particularly prior to the expected time at which foam will likely occur, because of the poor reliability of known detecting devices. Anti-foaming agents are expensive and also may become an inhibiting factor in connection with fermentation or may act as an inhibitor with respect to separation and refining of fermentation products.

Accordingly it is desirable to add a minimal quantity of anti-foaming agent in order to optimise fermentation. It is therefore an object of the present invention to provide a foam detector of good reliability.

More specifically it is an object of the invention to provide an apparatus for detecting the surface of a liquid or of a foam wherein the insulating parts for the detector electrode can be kept dry and preferably also the detector electrode itself.

According to the present invention, an apparatus for detecting the surface of a liquid or of a foam comprising a detector electrode arranged to be touched by the liquid or foam, an insulator for the detector electrode, a counter-electrode being provided for electrical contact with the liquid or foam, a change in electrical conductivity or capacitance between the electrodes being indicative as to whether the detector electrode is touching the liquid or foam, is characterised in that the detector electrode is surrounded by a shroud and means are provided for maintaining vapour surrounding the detector electrode and confined by the shroud in an unsaturated state.

In one embodiment of the invention, a heater is provided for heating the detector electrode whereby to heat also the surrounding shroud and vapour confined within the shroud and surrounding the detector electrode. Conveniently the heater is arranged within the detector electrode.

In another embodiment of the invention, the space within the shroud is purged by means of a relatively dry gas. In this embodiment the relatively dry gas is preferably supplied through the detector electrode which is hollow but is closed at its end and has a lateral opening or vent leading into the interior of the shroud.

Looking at the invention in another way, means are provided for drying the interior of the preferably cylindrical shroud. Thus according to another aspect of the invention, a method of detecting the surface of a liquid or foam in which a change in the electrical resistance or capacitance between a detector electrode, arranged to be touched by the liquid or foam, and a counter-electrode, electrically in contact with the liquid or foam, is sensed, is characterised by inhibiting the formation or deposition of moisture on insulating parts surrounding the detector electrode.

The actual detection of the surface of the liquid or foam is conducted in a conventional manner, the invention being characterised by drying or maintaining dry the detector electrode.

Figure 3:
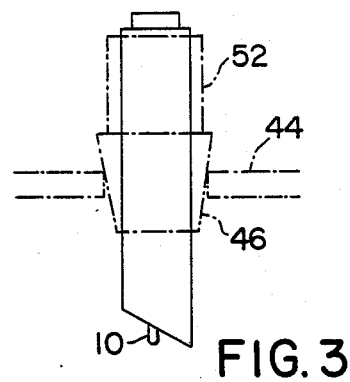
Figure 4:
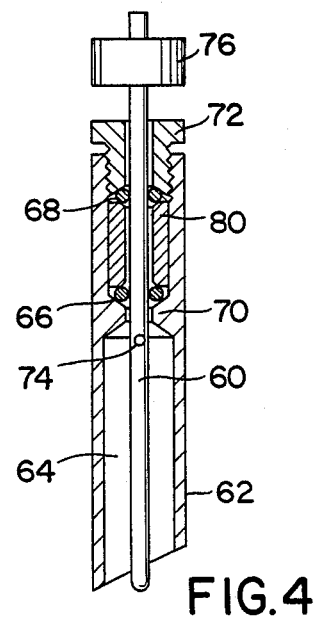
Figure 2:
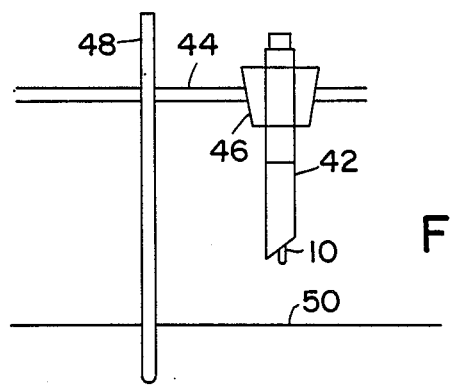

The invention is further described by way of example with reference to the accompanying drawings in which:

FIG. 1 is a longitudinal sectional view of one embodiment of detecting apparatus according to the invention, FIG. 2 is a diagrammatic view of the detecting apparatus in use in a fermentation vat, FIG. 3 is a diagrammatic view of a second embodiment of detecting apparatus, and FIG. 4 is a longitudinal sectional view of a third embodiment of detecting apparatus according to the invention.

An apparatus for detecting the surface of a liquid or foam as shown in FIG. 1 comprises a central detector electrode 10 which is surrounded at its lower end portion by a cylindrical plastic shroud or envelope 12 open at its lower end. A confined space 14 for vapour is thereby substantially enclosed by the shroud 12 and surrounds the central detector electrode 10. The plastic shroud 12 is secured to a main body 16 by means of a stainless steel screw threaded bush 18. An O-ring 20 is confined between the bush 18 and internal shoulder 22 inside the shroud 12 and is urged against the detector electrode 10 to establish and maintain a fluid seal and also to insulate the detector electrode. Two further O-rings 22 and 24 also help to insulatively support the centre electrode 10 and are confined between the bush 18 and an internal shoulder 26 in the body 16 with the interposition of a stainless steel spacer 28. A connector 30 is screwed into the rear or upper end of the body 16 and is sealed thereto by an O-ring 32. The connector 30 has a terminal connected via a lead wire 34 to the detector electrode 10 by means of solder 36. Two further terminals are connected by means or lead wires 38 and 40 to a heater (not shown) disposed within the electrode 10 which is made hollow for this purpose.

As shown in FIG. 2, the detecting apparatus 42 of FIG. 1 depends downwardly into a fermentation vat and is supported by means of a stainless steel head plate 44 with the interposition of a rubber plug 46. A counter electrode 48 is attached to the head plate 44 electrically conductively and extends downwardly below the surface 50 of the liquid or foam to be detected so as to remain immersed in and in permanent electrically conductive relationship with such liquid or foam. In use, the three terminals or the detecting apparatus 42 and the counter-electrode 48 are connected to suitable electrical circuitry whereby the heater is heated and whereby the electrical resistance and/or capacitance between the detector electrode 10 and the counter-electrode 48 is monitored. Preferably, the heater heats the detector electrode to a temperature of 10° C. to 50° C. above that of the vapour in the confined space 14. When the surface 50 rises so as to touch the tip of the detector electrode 10 a change in the electrical resistance or capacitance is detected, thereby indicating that the liquid or foam has reached the indicated level. If too high a temperature is used, there is a risk of components of the culture solution in the vat being burnt and adhered to the detector electrode. This would reduce the sensitivity of the detector electrode.

The effect of the shroud 12 is to confine within the space 14 the vapour surrounding the detector electrode 10. Thus, when this electrode is heated the vapour is also heated whereby its relative humidity is reduced. It is therefore ensured that there is substantially no condensation of liquid onto the detector electrode 10, onto the O-ring 20 or onto the interior of the shroud 12 which would affect the electrical resistance or capacitance. Also in the event of splashing or vigorous foaming in the vat it is ensured that liquid being splashed about does not reach the O-ring 20. Any liquid which does become deposited on the shroud 12 or on the detector electrode 10 is only deposited on the lower ends thereof and quickly runs away. To further promote running away of liquid that may become deposited on the shroud 12 the bottom end of the shroud 12 is chamfered as shown.

Instead of making the shroud 12 of plastics material, it could be made of an electrically conductive material, such as stainless steel. In that event, the shroud could also serve as the counter-electrode, whereby the level of the surface of the liquid or foam is detected when both electrodes are contacted by the liquid or foam.

A further possibility is to use two of the detector apparata of the kind shown in FIG. 1, wherein the centre electrode of one such apparatus serves as the counter-electrode.

The embodiment of FIG. 3 differs from that of FIG. 1 in that the heater 52 is not disposed within the centre electrode 10 but instead surrounds the upper end of the apparatus above the rubber plug 46 by which the apparatus is supported on the stainless steel head plate 44. Heat from the heater 52 is conducted via the body 16 and the centre detector electrode 10 to the shroud 12 and to the O-ring 20 such that this embodiment operates in the same way as that of FIG. 1.

Instead of using heat to keep the detector apparatus and particularly the insulating parts dry it is possible to use a relatively dry gas or relatively dry air to purge vapour from the vicinity of the centre electrode 60 as shown in FIG. 4. The centre electrode 60 is surrounded by a cylindrical plastic shroud 62 which is equivalent to the shroud 12 of FIG. 1 and forms a confined space 64 surrounding the lower end portion of the centre electrode 60. The centre electrode is secured in position by means of O-rings 66 and 68 which are confined between an internal shoulder 70 in the shroud 64 and a screw cap 72 screwed thereto into the upper end of the plastic shroud 62, a stainless steel spacer 80 being interposed between the O-rings 66 and 68. Detector electrode 60 is hollow or tubular but is closed at its lower end. A lateral air hole 74 is formed in the detector electrode so as to emerge into the confined space 64 just below the shoulder 70. Dry air is supplied via a filter 76 to the upper end of the centre detector electrode 60. In the embodiment of FIG. 4, a single electrical connection to the centre electrode 60 is all that is needed in addition to that to the counter-electrode. The detecting apparatus of FIG. 4 is used in the same way as those of FIGS. 1 to 3 except that a continous flow of relatively dry air into the confined space 64 is maintained instead of heating the apparatus. The relatively dry air displaces vapour from the confined space 64 and thereby maintains the relative humidity in the space at a low value to inhibit any condensation onto the centre electrode or onto the shroud 62 and most importantly onto the O-ring 66.

The shroud 62 is chamfered at its lower end as in the embodiment in FIG. 1 and protects the O-ring 70 and adjacent parts from splashing.

I claim:

1. An apparatus for detecting the surface of a liquid or of a foam comprising a detector electrode (10) arranged to be touched by the liquid or foam, an insulator (20, 64) for the detector electrode (10), a counter-electrode (48) for electrical contact with the liquid or foam being provided, a change in electrical conductivity (or capacitance) between the electrodes being indicative as to whether the detector electrode (10) is touching the surface of the liquid or foam, characterized in that the detector electrode (10) is surrounded by a shroud (12) having an open lower end and means are provided for maintaining vapour surrounding the detector electrode (10) and confined by the shroud (12) in an unsaturated state, said means for maintaining the vapour surrounding the detector electrode unsaturated comprising a drying device, said drying device comprising a heater for heating the detector electrode (10).

2. Apparatus according to claim 1, in which the heater is disposed inside the detector electrode.

3. Apparatus according to claim 1, in which the heater surrounds the rear end of the detector electrode.

4. An apparatus for detecting the surface of a liquid or of a foam comprising a detector electrode (10) arranged to be touched by the liquid or foam, an insulator (20, 64) for the detector electrode (10), a counter-electrode (48) for electrical contact with the liquid or foam being provided, a change in electrical conductivity (or capacitance) between the electrodes being indicative as to whether the detector electrode (10) is touching the surface of the liquid or foam, characterized in that the detector electrode (10) is surrounded by a shroud (12) having an open lower end and means are provided for maintaining vapour surrounding the detector electrode (10) and confined by the shroud (12) in an unsaturated state, said means for maintaining the vapour surrounding the detector electrode unsaturated comprising a drying device, said drying device comprising means for supplying dry air or other gas to the space between the shroud and the detector electrode, said detector electrode (60) being tubular and having a lateral opening (74) spaced from its tip which is closed and opening within said space (64) through which the dry air is directed into the space between the detector electrode shroud.

5. A method of detecting the surface of a liquid or of a foam in which a change in the electrical resistance between a detector electrode, arranged to be touched by the liquid or foam, and a counter-electrode, electrically in contact with the liquid or foam, is sensed, is characterized by inhibiting the formation or deposition of moisture on insulating parts surrounding the detector electrode, said step of inhibiting the formation or deposition of moisture comprising heating the space between the detector electrode and the shroud.

6. The method set forth in claim 5 wherein said step of heating comprises heating the detector electrode.

7. The method set forth in claim 6 including the step of purging the space between the detector electrode and the shroud with dry air or other gas.

8. The method set forth in claim 7 wherein said step of purging the space comprise supplying dry air or other gas through the detector electrode into the space.

* * * * *